US007877686B2

(12) United States Patent
Abbott et al.

(10) Patent No.: US 7,877,686 B2
(45) Date of Patent: Jan. 25, 2011

(54) DYNAMICALLY DISPLAYING CURRENT STATUS OF TASKS

(75) Inventors: Kenneth H. Abbott, Kirkland, WA (US); Dan Newell, Medina, WA (US); James O. Robarts, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 498 days.

(21) Appl. No.: 11/548,569

(22) Filed: Oct. 11, 2006

(65) Prior Publication Data
US 2007/0089067 A1 Apr. 19, 2007

Related U.S. Application Data

(63) Continuation of application No. 09/879,829, filed on Jun. 11, 2001, now abandoned.

(60) Provisional application No. 60/240,685, filed on Oct. 16, 2000.

(51) Int. Cl.
*G06F 3/00* (2006.01)
*G06F 3/048* (2006.01)
(52) U.S. Cl. .............. 715/712; 715/708; 715/772; 715/786; 715/810; 715/818; 715/821; 715/823
(58) Field of Classification Search ........... 715/708, 715/821, 818, 810, 772, 712
See application file for complete search history.

(56) References Cited

U.S. PATENT DOCUMENTS 3,973,251 A 8/1976 Stephans
4,283,712 A 8/1981 Goody
4,458,331 A 7/1984 Amezcua et al.

(Continued)

FOREIGN PATENT DOCUMENTS

EP 0661627 A1 7/1995

(Continued)

OTHER PUBLICATIONS

Affective Understanding: Modeling and Responding to User Affect. Http://www.media.mit.edu/affect/AC_research/understanding.html. Last accessed Oct. 2, 1998, pp. 1-3.

(Continued)

*Primary Examiner*—Tadesse Hailu
*Assistant Examiner*—Nicholas S Ulrich
(74) *Attorney, Agent, or Firm*—Wolf, Greenfield & Sacks, P.C.

(57) ABSTRACT

The current status of a list of tasks to be performed is dynamically displayed. The tasks may be performed by a user (e.g., data entered by the user, words spoken by the user, actions taken by the user, and so forth) or alternatively by a computer (e.g., the steps it follows in carrying out a programmed task). At least a portion of the list is displayed at any given time along with an indication of which task is the next task to be performed. As the tasks are completed, the current status of the progression through the items on the list is dynamically updated so as to readily inform the user (or someone else) as to what the current task is that needs to be performed, as well as what tasks have already been performed and/or what tasks remain to be performed.

20 Claims, 8 Drawing Sheets

U.S. PATENT DOCUMENTS

| | | | |
|---|---|---|---|
| 4,569,026 A | 2/1986 | Best | |
| 4,815,030 A | 3/1989 | Cross et al. | |
| 4,905,163 A | 2/1990 | Garber et al. | |
| 4,916,441 A | 4/1990 | Gombrich | |
| 4,970,683 A * | 11/1990 | Harshaw et al. | 715/841 |
| 4,991,087 A | 2/1991 | Burkowski et al. | |
| 5,032,083 A * | 7/1991 | Friedman | 434/112 |
| 5,133,075 A | 7/1992 | Risch | |
| 5,201,034 A | 4/1993 | Matsuura et al. | |
| 5,208,449 A | 5/1993 | Eastman et al. | |
| 5,214,757 A | 5/1993 | Mauney et al. | |
| 5,227,614 A | 7/1993 | Danielson et al. | |
| 5,237,684 A | 8/1993 | Record et al. | |
| 5,251,294 A | 10/1993 | Abelow | |
| 5,267,147 A * | 11/1993 | Harshaw et al. | 705/32 |
| 5,278,946 A | 1/1994 | Shimada et al. | |
| 5,285,398 A | 2/1994 | Janik | |
| 5,317,568 A | 5/1994 | Bixby et al. | |
| 5,327,529 A | 7/1994 | Fults et al. | |
| 5,335,276 A | 8/1994 | Thompson et al. | |
| 5,339,395 A | 8/1994 | Pickett et al. | |
| 5,353,399 A | 10/1994 | Kuwamoto et al. | |
| 5,388,198 A | 2/1995 | Layman et al. | |
| 5,398,021 A | 3/1995 | Moore | |
| 5,416,730 A | 5/1995 | Lookofsky | |
| 5,454,074 A * | 9/1995 | Hartel et al. | 715/710 |
| 5,470,233 A | 11/1995 | Fruchterman et al. | |
| 5,471,629 A | 11/1995 | Risch | |
| 5,481,667 A * | 1/1996 | Bieniek et al. | 715/709 |
| 5,493,692 A | 2/1996 | Theimer et al. | |
| 5,506,580 A | 4/1996 | Whiting et al. | |
| 5,513,646 A | 5/1996 | Lehrman et al. | |
| 5,522,026 A * | 5/1996 | Records et al. | 715/710 |
| 5,535,323 A | 7/1996 | Miller et al. | |
| 5,537,618 A | 7/1996 | Boulton et al. | |
| 5,539,665 A | 7/1996 | Lamming et al. | |
| 5,544,321 A | 8/1996 | Theimer et al. | |
| 5,553,609 A | 9/1996 | Chen et al. | |
| 5,555,376 A | 9/1996 | Theimer et al. | |
| 5,559,520 A | 9/1996 | Barzegar et al. | |
| 5,560,012 A | 9/1996 | Ryu et al. | |
| 5,566,337 A | 10/1996 | Szymanski et al. | |
| 5,568,645 A | 10/1996 | Morris et al. | |
| 5,572,401 A | 11/1996 | Carroll | |
| 5,592,664 A | 1/1997 | Starkey | |
| 5,601,435 A | 2/1997 | Quy | |
| 5,603,054 A | 2/1997 | Theimer et al. | |
| 5,611,050 A * | 3/1997 | Theimer et al. | 709/202 |
| 5,642,303 A | 6/1997 | Small et al. | |
| 5,646,629 A | 7/1997 | Loomis et al. | |
| 5,659,746 A | 8/1997 | Bankert et al. | |
| 5,675,358 A | 10/1997 | Bullock et al. | |
| 5,689,619 A | 11/1997 | Smyth | |
| 5,689,708 A | 11/1997 | Regnier et al. | |
| 5,701,894 A | 12/1997 | Cherry et al. | |
| 5,704,366 A | 1/1998 | Tacklind et al. | |
| 5,710,884 A | 1/1998 | Dedrick | |
| 5,715,451 A | 2/1998 | Marlin | |
| 5,717,747 A | 2/1998 | Boyle, III et al. | |
| 5,719,744 A | 2/1998 | Jenkins et al. | |
| 5,726,660 A | 3/1998 | Purdy et al. | |
| 5,726,688 A | 3/1998 | Siefert et al. | |
| 5,740,037 A | 4/1998 | McCann et al. | |
| 5,742,279 A | 4/1998 | Yamamoto et al. | |
| 5,745,110 A * | 4/1998 | Ertemalp | 715/764 |
| 5,751,260 A | 5/1998 | Nappi et al. | |
| 5,752,019 A | 5/1998 | Rigoutsos et al. | |
| 5,754,938 A | 5/1998 | Herz et al. | |
| 5,761,662 A | 6/1998 | Dasan | |
| 5,769,085 A | 6/1998 | Kawakami et al. | |
| 5,781,913 A | 7/1998 | Felsenstein et al. | |
| 5,787,234 A | 7/1998 | Molloy | |
| 5,787,279 A | 7/1998 | Rigoutsos | |
| 5,790,974 A | 8/1998 | Tognazzini | |
| 5,796,952 A | 8/1998 | Davis et al. | |
| 5,798,733 A | 8/1998 | Ethridge | |
| 5,806,079 A | 9/1998 | Rivette et al. | |
| 5,812,865 A | 9/1998 | Theimer et al. | |
| 5,818,446 A | 10/1998 | Bertram et al. | |
| 5,826,253 A | 10/1998 | Bredenberg | |
| 5,831,594 A * | 11/1998 | Tognazzini et al. | 345/156 |
| 5,832,296 A | 11/1998 | Wang et al. | |
| 5,835,087 A | 11/1998 | Herz et al. | |
| 5,852,814 A | 12/1998 | Allen | |
| 5,867,171 A | 2/1999 | Murata et al. | |
| 5,873,070 A | 2/1999 | Bunte et al. | |
| 5,878,274 A | 3/1999 | Kono et al. | |
| 5,879,163 A | 3/1999 | Brown et al. | |
| 5,881,231 A | 3/1999 | Takagi et al. | |
| 5,899,963 A | 5/1999 | Hutchings | |
| 5,902,347 A | 5/1999 | Backman et al. | |
| 5,905,492 A | 5/1999 | Straub et al. | |
| 5,910,799 A * | 6/1999 | Carpenter et al. | 715/866 |
| 5,911,132 A | 6/1999 | Sloane | |
| 5,913,030 A | 6/1999 | Lotspiech et al. | |
| 5,924,074 A | 7/1999 | Evans | |
| 5,937,160 A | 8/1999 | Davis et al. | |
| 5,938,721 A | 8/1999 | Dussell et al. | |
| 5,942,986 A | 8/1999 | Shabot et al. | |
| 5,945,988 A | 8/1999 | Williams et al. | |
| 5,948,041 A | 9/1999 | Abo et al. | |
| 5,953,718 A | 9/1999 | Wical | |
| 5,959,611 A | 9/1999 | Smailagic et al. | |
| 5,966,126 A | 10/1999 | Szabo | |
| 5,966,533 A | 10/1999 | Moody | |
| 5,966,710 A | 10/1999 | Burrows | |
| 5,971,580 A | 10/1999 | Hall et al. | |
| 5,974,262 A | 10/1999 | Fuller et al. | |
| 5,977,968 A | 11/1999 | Le Blanc | |
| 5,980,096 A | 11/1999 | Thalhammer-Reyero | |
| 5,983,335 A | 11/1999 | Dwyer, III | |
| 5,991,687 A | 11/1999 | Hale et al. | |
| 5,991,735 A | 11/1999 | Gerace | |
| 5,995,956 A | 11/1999 | Nguyen | |
| 5,999,192 A | 12/1999 | Paul | |
| 5,999,943 A | 12/1999 | Nori et al. | |
| 5,999,975 A | 12/1999 | Kittaka et al. | |
| 6,003,082 A | 12/1999 | Gampper et al. | |
| 6,006,251 A | 12/1999 | Toyouchi et al. | |
| 6,012,152 A | 1/2000 | Douik et al. | |
| 6,014,638 A | 1/2000 | Burge et al. | |
| 6,023,729 A | 2/2000 | Samuel et al. | |
| 6,041,331 A | 3/2000 | Weiner et al. | |
| 6,041,365 A | 3/2000 | Kleinerman | |
| 6,044,415 A | 3/2000 | Futral et al. | |
| 6,047,301 A | 4/2000 | Bjorklund et al. | |
| 6,047,327 A | 4/2000 | Tso et al. | |
| 6,055,516 A | 4/2000 | Johnson et al. | |
| 6,061,610 A | 5/2000 | Boer | |
| 6,064,943 A | 5/2000 | Clark, Jr. et al. | |
| 6,067,084 A | 5/2000 | Fado et al. | |
| 6,081,814 A | 6/2000 | Mangat et al. | |
| 6,085,086 A | 7/2000 | La Porta et al. | |
| 6,088,689 A | 7/2000 | Kohn et al. | |
| 6,091,411 A | 7/2000 | Straub et al. | |
| 6,092,101 A | 7/2000 | Birrell et al. | |
| 6,094,625 A | 7/2000 | Ralston | |
| 6,098,065 A | 8/2000 | Skillen et al. | |
| 6,105,063 A | 8/2000 | Hayes, Jr. | |
| 6,108,197 A | 8/2000 | Janik | |
| 6,108,665 A | 8/2000 | Bair et al. | |
| 6,112,246 A | 8/2000 | Horbal et al. | |
| 6,122,348 A | 9/2000 | French-St. George et al. | |
| 6,122,960 A | 9/2000 | Hutchings et al. | |

| | | | | | | |
|---|---|---|---|---|---|---|
| 6,127,990 | A | 10/2000 | Zwern | 6,539,336 | B1 | 3/2003 | Vock et al. |
| 6,131,067 | A | 10/2000 | Girerd et al. | 6,542,889 | B1 | 4/2003 | Aggarwal et al. |
| 6,134,532 | A | 10/2000 | Lazarus et al. | 6,546,425 | B1 | 4/2003 | Hanson et al. |
| 6,154,745 | A | 11/2000 | Kari et al. | 6,546,554 | B1 | 4/2003 | Schmidt et al. |
| 6,155,960 | A | 12/2000 | Roberts et al. | 6,549,915 | B2 | 4/2003 | Abbott et al. |
| 6,164,541 | A | 12/2000 | Dougherty et al. | 6,549,944 | B1 | 4/2003 | Weinberg et al. |
| 6,169,976 | B1 | 1/2001 | Colosso | 6,553,336 | B1 | 4/2003 | Johnson et al. |
| 6,185,534 | B1 | 2/2001 | Breese et al. | 6,563,430 | B1 | 5/2003 | Kemink et al. |
| 6,188,399 | B1 | 2/2001 | Voas et al. | 6,568,595 | B1 | 5/2003 | Rusell et al. |
| 6,195,622 | B1 | 2/2001 | Altschuler et al. | 6,571,279 | B1 | 5/2003 | Herz et al. |
| 6,198,394 | B1 | 3/2001 | Jacobsen et al. | 6,578,019 | B1 | 6/2003 | Suda et al. |
| 6,199,099 | B1 | 3/2001 | Gershman et al. | 6,625,135 | B1 | 9/2003 | Johnson et al. |
| 6,215,405 | B1 | 4/2001 | Handley et al. | 6,636,831 | B1 | 10/2003 | Profit, Jr. et al. |
| 6,218,958 | B1 | 4/2001 | Eichstaedt et al. | 6,643,684 | B1 | 11/2003 | Malkin et al. |
| 6,230,111 | B1 | 5/2001 | Mizokawa | 6,652,283 | B1 | 11/2003 | Van Schaack et al. |
| 6,236,768 | B1 | 5/2001 | Rhodes et al. | 6,661,437 | B1 | 12/2003 | Miller et al. |
| 6,256,633 | B1 | 7/2001 | Dharap | 6,672,506 | B2 | 1/2004 | Swartz et al. |
| 6,262,720 | B1 * | 7/2001 | Jeffrey et al. ................ 715/710 | 6,697,836 | B1 | 2/2004 | Kawano et al. |
| 6,263,268 | B1 | 7/2001 | Nathanson | 6,704,722 | B2 | 3/2004 | Wang Baldonado |
| 6,263,317 | B1 | 7/2001 | Sharp et al. | 6,704,785 | B1 | 3/2004 | Koo et al. |
| 6,272,470 | B1 | 8/2001 | Teshima | 6,704,812 | B2 | 3/2004 | Bakke et al. |
| 6,272,507 | B1 | 8/2001 | Pirolli et al. | 6,707,476 | B1 | 3/2004 | Hochstedler |
| 6,282,517 | B1 | 8/2001 | Wolfe et al. | 6,712,615 | B2 | 3/2004 | Martin |
| 6,285,757 | B1 | 9/2001 | Carroll et al. | 6,714,977 | B1 | 3/2004 | Fowler et al. |
| 6,285,889 | B1 | 9/2001 | Nykanen et al. | 6,738,040 | B2 | 5/2004 | Jahn et al. |
| 6,289,316 | B1 | 9/2001 | Aghili et al. | 6,738,759 | B1 | 5/2004 | Wheeler et al. |
| 6,289,513 | B1 | 9/2001 | Bentwich | 6,741,188 | B1 | 5/2004 | Miller et al. |
| 6,292,796 | B1 | 9/2001 | Drucker et al. | 6,741,610 | B1 | 5/2004 | Volftsun et al. |
| 6,294,953 | B1 | 9/2001 | Steeves | 6,747,675 | B1 | 6/2004 | Abbott et al. |
| 6,305,007 | B1 | 10/2001 | Mintz | 6,751,620 | B2 | 6/2004 | Orbanes et al. |
| 6,305,221 | B1 | 10/2001 | Hutchings | 6,766,245 | B2 | 7/2004 | Padmanabhan |
| 6,308,203 | B1 | 10/2001 | Itabashi et al. | D494,584 | S | 8/2004 | Schlieffers et al. |
| 6,311,162 | B1 | 10/2001 | Reichwein et al. | 6,791,580 | B1 | 9/2004 | Abbott et al. |
| 6,314,384 | B1 | 11/2001 | Goetz | 6,795,806 | B1 * | 9/2004 | Lewis et al. ................ 704/260 |
| 6,317,718 | B1 | 11/2001 | Fano | 6,796,505 | B2 | 9/2004 | Pellaumail et al. |
| 6,321,158 | B1 | 11/2001 | DeLorme et al. | 6,801,223 | B1 | 10/2004 | Abbott et al. |
| 6,321,279 | B1 | 11/2001 | Bonola | 6,812,937 | B1 | 11/2004 | Abbott et al. |
| 6,327,535 | B1 | 12/2001 | Evans et al. | 6,829,639 | B1 | 12/2004 | Lawson et al. |
| 6,349,307 | B1 | 2/2002 | Chen | 6,834,195 | B2 | 12/2004 | Brandenberg et al. |
| 6,353,398 | B1 | 3/2002 | Amin et al. | 6,834,208 | B2 | 12/2004 | Gonzales et al. |
| 6,353,823 | B1 | 3/2002 | Kumar | 6,837,436 | B2 | 1/2005 | Swartz et al. |
| 6,356,905 | B1 | 3/2002 | Gershman et al. | 6,842,877 | B2 | 1/2005 | Robarts et al. |
| 6,363,377 | B1 | 3/2002 | Kravets et al. | 6,853,966 | B2 | 2/2005 | Bushey et al. |
| 6,385,589 | B1 | 5/2002 | Trusheim et al. | 6,868,525 | B1 | 3/2005 | Szabo |
| 6,392,670 | B1 * | 5/2002 | Takeuchi et al. ............. 715/760 | 6,874,017 | B1 | 3/2005 | Inoue et al. |
| 6,401,085 | B1 | 6/2002 | Gershman et al. | 6,874,127 | B2 | 3/2005 | Newell et al. |
| 6,405,159 | B2 | 6/2002 | Bushey et al. | 6,885,734 | B1 | 4/2005 | Eberle et al. |
| 6,405,206 | B1 | 6/2002 | Kayahara | 6,963,899 | B1 | 11/2005 | Fernandez et al. |
| 6,418,424 | B1 | 7/2002 | Hoffberg et al. | 6,968,333 | B2 | 11/2005 | Abbott et al. |
| 6,421,700 | B1 | 7/2002 | Holmes et al. | 7,000,187 | B2 * | 2/2006 | Messinger et al. .......... 715/705 |
| 6,427,142 | B1 | 7/2002 | Zachary et al. | 7,010,501 | B1 | 3/2006 | Roslak et al. |
| 6,430,531 | B1 | 8/2002 | Polish | 7,010,603 | B2 | 3/2006 | Martin, Jr. et al. |
| 6,438,618 | B1 | 8/2002 | Lortz et al. | 7,040,541 | B2 | 5/2006 | Swartz et al. |
| 6,442,549 | B1 | 8/2002 | Schneider | 7,046,263 | B1 | 5/2006 | Abbott et al. |
| 6,442,589 | B1 | 8/2002 | Takahashi et al. | 7,055,101 | B2 | 5/2006 | Abbott et al. |
| 6,442,620 | B1 | 8/2002 | Thatte et al. | 7,058,893 | B2 | 6/2006 | Abbott et al. |
| 6,446,076 | B1 | 9/2002 | Burkey et al. | 7,058,894 | B2 | 6/2006 | Abbott et al. |
| 6,446,109 | B2 | 9/2002 | Gupta | 7,062,715 | B2 | 6/2006 | Abbott et al. |
| 6,460,036 | B1 | 10/2002 | Herz | 7,063,263 | B2 | 6/2006 | Swartz et al. |
| 6,462,759 | B1 | 10/2002 | Kurtzberg et al. | 7,076,737 | B2 | 7/2006 | Abbott et al. |
| 6,466,232 | B1 | 10/2002 | Newell et al. | 7,080,322 | B2 | 7/2006 | Abbott et al. |
| 6,477,117 | B1 | 11/2002 | Narayanaswami et al. | 7,089,497 | B2 | 8/2006 | Abbott et al. |
| 6,483,485 | B1 | 11/2002 | Huang et al. | 7,096,253 | B2 | 8/2006 | Vinson et al. |
| 6,484,200 | B1 | 11/2002 | Angal et al. | 7,103,806 | B1 | 9/2006 | Horvitz |
| 6,487,552 | B1 | 11/2002 | Lei et al. | 7,107,539 | B2 | 9/2006 | Abbott et al. |
| 6,490,579 | B1 | 12/2002 | Gao et al. | 7,110,764 | B1 | 9/2006 | Blair et al. |
| 6,505,196 | B2 | 1/2003 | Drucker et al. | 7,120,558 | B2 | 10/2006 | McIntyre et al. |
| 6,507,567 | B1 | 1/2003 | Willars | 7,124,125 | B2 | 10/2006 | Cook et al. |
| 6,507,845 | B1 | 1/2003 | Cohen et al. | 7,137,069 | B2 | 11/2006 | Abbott et al. |
| 6,513,046 | B1 | 1/2003 | Abbott et al. | 7,155,456 | B2 | 12/2006 | Abbott, III et al. |
| 6,519,552 | B1 | 2/2003 | Sampath et al. | 7,162,473 | B2 | 1/2007 | Dumais et al. |
| 6,526,035 | B1 | 2/2003 | Atarius et al. | 7,171,378 | B2 | 1/2007 | Petrovich et al. |
| 6,529,723 | B1 | 3/2003 | Bentley | 7,195,157 | B2 | 3/2007 | Swartz et al. |

| | | | |
|---|---|---|---|
| 7,203,906 B2 | 4/2007 | Abbott et al. | |
| 7,225,229 B1 | 5/2007 | Abbott et al. | |
| 7,231,439 B1 | 6/2007 | Abbott et al. | |
| 7,260,453 B2 * | 8/2007 | Poier et al. | 701/1 |
| 7,349,894 B2 | 3/2008 | Barth et al. | |
| 7,360,152 B2 | 4/2008 | Capps et al. | |
| 7,385,501 B2 | 6/2008 | Miller et al. | |
| 7,386,477 B2 | 6/2008 | Fano | |
| 7,392,486 B1 * | 6/2008 | Gyde et al. | 715/780 |
| 7,395,221 B2 | 7/2008 | Doss et al. | |
| 7,444,594 B2 | 10/2008 | Abbott et al. | |
| 7,464,153 B1 | 12/2008 | Abbott et al. | |
| 7,512,889 B2 | 3/2009 | Newell et al. | |
| 7,533,052 B2 | 5/2009 | Tilfors et al. | |
| 7,533,082 B2 | 5/2009 | Abbott et al. | |
| 7,561,200 B2 | 7/2009 | Garvey, III et al. | |
| 7,571,218 B2 | 8/2009 | Tanaka et al. | |
| 7,614,001 B2 | 11/2009 | Abbott et al. | |
| 7,647,400 B2 | 1/2010 | Abbott et al. | |
| 7,689,919 B2 | 3/2010 | Abbott et al. | |
| 7,734,780 B2 | 6/2010 | Abbott et al. | |
| 7,739,607 B2 | 6/2010 | Abbott et al. | |
| 7,779,015 B2 | 8/2010 | Abbott et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0147880 A1 | 10/2002 | Wang Baldonado | |
| 2002/0191034 A1 | 12/2002 | Sowizral et al. | |
| 2003/0046401 A1 | 3/2003 | Abbott et al. | |
| 2003/0154476 A1 | 8/2003 | Abbott, III et al. | |
| 2003/0186201 A1 | 10/2003 | Martin | |
| 2003/0229900 A1 | 12/2003 | Reisman | |
| 2004/0088328 A1 | 5/2004 | Cook et al. | |
| 2004/0133600 A1 | 7/2004 | Homer | |
| 2004/0186854 A1 | 9/2004 | Choi | |
| 2004/0201500 A1 | 10/2004 | Miller et al. | |
| 2004/0215663 A1 | 10/2004 | Liu et al. | |
| 2004/0267700 A1 | 12/2004 | Dumais et al. | |
| 2004/0267812 A1 | 12/2004 | Harris et al. | |
| 2005/0027704 A1 | 2/2005 | Hammond et al. | |
| 2005/0034078 A1 | 2/2005 | Abbott et al. | |
| 2005/0066282 A1 | 3/2005 | Abbott et al. | |
| 2005/0086243 A1 | 4/2005 | Abbott et al. | |
| 2005/0160113 A1 | 7/2005 | Sipusic et al. | |
| 2005/0165843 A1 | 7/2005 | Capps et al. | |
| 2005/0193017 A1 | 9/2005 | Kim | |
| 2005/0266858 A1 | 12/2005 | Miller et al. | |
| 2005/0272442 A1 | 12/2005 | Miller et al. | |
| 2006/0004680 A1 | 1/2006 | Robarts et al. | |
| 2006/0019676 A1 | 1/2006 | Miller et al. | |
| 2006/0136393 A1 | 6/2006 | Abbott et al. | |
| 2006/0259494 A1 | 11/2006 | Watson et al. | |
| 2007/0022384 A1 | 1/2007 | Abbott et al. | |
| 2007/0043459 A1 | 2/2007 | Abbott et al. | |
| 2007/0130524 A1 | 6/2007 | Abbott et al. | |
| 2007/0168502 A1 | 7/2007 | Abbott et al. | |
| 2007/0185864 A1 | 8/2007 | Budzik et al. | |
| 2007/0266318 A1 | 11/2007 | Abbott et al. | |
| 2008/0090591 A1 | 4/2008 | Miller et al. | |
| 2008/0091537 A1 | 4/2008 | Miller et al. | |
| 2008/0147775 A1 | 6/2008 | Abbott et al. | |
| 2008/0161018 A1 | 7/2008 | Miller et al. | |
| 2008/0313271 A1 | 12/2008 | Abbott et al. | |
| 2009/0013052 A1 | 1/2009 | Robarts et al. | |
| 2009/0055752 A1 | 2/2009 | Abbott et al. | |
| 2009/0094524 A1 | 4/2009 | Abbott et al. | |
| 2009/0150535 A1 | 6/2009 | Abbott et al. | |
| 2009/0228552 A1 | 9/2009 | Abbott et al. | |
| 2009/0234878 A1 | 9/2009 | Herz et al. | |
| 2009/0282030 A1 | 11/2009 | Abbott et al. | |
| 2010/0217862 A1 | 8/2010 | Abbott et al. | |

FOREIGN PATENT DOCUMENTS

| | | |
|---|---|---|
| EP | 0759591 A1 | 2/1997 |
| EP | 0801342 A2 | 10/1997 |
| EP | 0823813 A2 | 2/1998 |
| EP | 0846440 A2 | 6/1998 |
| EP | 0924615 A2 | 6/1999 |
| JP | 05260188 A | 10/1993 |
| JP | 09091112 A | 4/1997 |
| JP | 11306002 A | 11/1999 |
| WO | WO-9008361 A1 | 7/1990 |
| WO | WO95/31773 A1 | 11/1995 |
| WO | WO-9703434 A1 | 1/1997 |
| WO | WO-9734388 A2 | 9/1997 |
| WO | WO-9800787 A1 | 1/1998 |
| WO | WO-9847084 A1 | 10/1998 |
| WO | WO-9917228 A1 | 4/1999 |
| WO | WO-9926180 A1 | 5/1999 |
| WO | WO-9966394 A1 | 12/1999 |
| WO | WO-9967698 A2 | 12/1999 |
| WO | WO-0036493 A1 | 6/2000 |

OTHER PUBLICATIONS

Alps GlidePoint. Http://www.alps.com/p17.html. Last accessed Feb. 10, 1998, p. 1.
Amon, et al. "Integration Of Design Education, Research and Practice at Carnegie Mellon University: A Multi-Disciplinary Course in Wearable Computer Design," Proceedings of The Frontiers in Education Conference, Nov. 1-4, 1995, pp. 4a1.14-4a1.22, vol. 2.
Aoki, et al. Realtime Personal Positioning System for a Wearable Computer. Third International Symposium on Wearable Computers, San Francisco, California, October 18-19, 199.
Bacon, et al. "Using Events to Build Distributed Applications," University of Cambridge, 1996. http://citeseerx.ist.psu.edu/viewdoc/summary?doi=10.1.1.34.4545. Last accessed Dec. 9, 2008, 8 pages.
Bauer, et al. A Collaborative Wearable System with Remote Sensing. University of Oregon, Feb. 1996.
Bier, et al. "Toolglass and Magic Lenses: The See-Through Interface," Proceedings of SIGGRAPH'93, Computer Graphics and Annual Conference Series, ACM, pp. 73-80, Anaheim, California, 1993. http://citeseerx.ist.psu.edu/viewdoc/summary?doi=10.1.1.36.9741. Last accessed Dec. 9, 2008, 8 pages.
Billinghurst, et al. Wearable Devices: New Ways to Manage Information, IEEE Computer Society, Jan. 1999, pp. 57-64.
Billinghurst, et al., An Evaluation of Wearable Information Spaces, Proceedings of the Virtual Reality Annual International Symposium, 1998, 8 pages.
Billinghurst. Research Directions in Wearable Computing, University of Washington, May 1998, 48 pages.
Bishop. "Hard Ware," Jul. 28, 2000, Puget Sound Business Journal, print edition, pp. 1-4.
Biskup, et al. "Towards Secure Mediation." Oct. 1998.
Bowskill, et al. Wearable Location Mediated Telecommunications: A First Step Towards Contexual Communication. Third International Symposium on Wearable Computers, Oct. 18-19, 1999, San Francisco, California.
Brown, et al. "Using Explicit Requirement and Metrics for Interface Agent User Model Correction." Autonomous Agents '98.

Brown, et al. "Utility Theory-Based User Models for Intelligent Interface Agents," Proceedings of the Twelfth Canadian Conference on Artificial Intelligence (AI'98), Jun. 1998.

Budzik, et al. "Watson: Anticipating and Contextualizing Information Needs," May 1, 1999, Proceedings of the 62nd Annual Meeting of the American Society for Information Science, pp. 1-14.

Chen, et al., A Survey of Context-Aware Mobile Computing Research, Dartmouth Computer Science Technical Report, 2000, 16 pages.

""Context-Awareness in Wearable and Ubiquitous Computing."" Future Computing Environments, 1997. GVU Technical Report GIT-GVU-97-11. http://www.cc.gatech.edu/fce/pubs/iswc97/wear.html. Last accessed Dec. 8, 2008, 13 pages."

"Context Recognition by User Situation Data Analysis (Context)." http://www.cs.helsinki.fi/group/context/. Last accessed Dec. 9, 2008, 7 pages.

Crabtree, et al. "Wearable Computing and the Remembrance Agent," BT Technology Journal, vol. 16, No. 3, Jul. 1998, pp. 118-124. http://citeseerx.ist.psu.edu/viewdoc/summary?doi=10.1.1.31.8514. Last accessed Dec. 9, 2008, 7 pages.

Dey, et al. The Conference Assistant Combining Context Awareness with Wearable Computing. Third International Symposium on Wearable Computers, Oct. 18-19, 1999, San Francisco, California.

Doorenbos, et al. "A Scalable Comparison-Shopping Agent for the Worl-Wide-Web," Proceedings of the First International Conference on Autonomous Agents, Marina Del Rey, California, Feb. 5-8, 1997, pp. 39-48. http://www.cs.washington.edu/homes/etzioni/papers/agents97.pdf. Last accessed Dec. 9, 2008, 10 pages.

D'Orazio, et al. Mobile Robot Position Determination Using Visual Landmarks. IEEE Transactions on Industrial Electronics, vol. 41, issue 6, Dec. 1994, pp. 654-662. Last accessed Dec. 9, 2008, 9 pages.

Finger, et al. Rapid Design and Manufacture of Wearable Computers. Communication of the ACM, vol. 39, No. 2, Feb. 1996, pp. 63-68.

Gabbard, et al. A Taxonomy of Usability Characteristics in Virtual Environments. 1997.

Gavrilova. An Approach to Mapping of User Model to Corresponding Interface Parameters. 1997.

Goh, et al. "Context Interchange: New Features and Formalisms for the Intelligent Integration of Information," ACM Transactions on Information Systems, 1997. http://dspace.mit.edu/bitstream/handle/1721.1/2642/SWP-3941-36987967.pdf?sequence=1. Last accessed Dec. 10, 2008, 25 pages.

Golding, et al. Indoor Navigation Using a Diverse Set of Cheap, Wearable Sensors. Third International Symposium on Wearable Computers, Oct. 18-19, 1999, San Francisco, California.

Goodridge. "The Environment Understanding Interface: Detecting and Tracking Human Activity Through Multimedia Sensors." 1995.

GyroPoint Technology. http://www.gyration.com/html/gyropoint.html. Last accessed Oct. 2, 1998, pp. 1-3.

Harter, et al. "A Distributed Location System for the Active Office." IEEE Network, 1994, pp. 62-70.

Horvitz, et al., Attention-Sensitive Alerting in Computing Systems, Microsoft Research, Aug. 1999.

Horvitz, et al., In Pursuit of Effective Handsfree Decision Support: Coupling Bayesian Inference, Speech Understanding, and User Models, 1995, 8 pages.

Hull, et al. Towards Situated Computing. Hewlette-Packard Laboratories, HPL-97-66 (1997).

"Intelligent User Interface Prompt Level," IBM Technical Disclosure Bulletin, IBM Corp., New York, vol. 35, No. 1A, Jun. 1992, pp. 25-26.

International Search Report for PCT Application No. PCT/US01/10394, mailed Jun. 13, 2002, 5 pages.

International Search Report dated Sep. 29, 2003 for PCT Application Serial No. 00/20685, 3 Pages.

International Search Report PCT/US01/32543, Oct. 27, 2003, 3 pages.

Jakobovits. "Integrating Autonomous Heterogeneous Information Sources." University of Washington, Technical Report, UV-CSE-971205, Jul. 15, 1997, 29 pages.

Kirsch. The Sentic Mouse: A Tool for Measuring Emotional Valence. Http:/www.media.mit.edu/affect/AC_research/projects/sentic_mouse.html. Last accessed Feb. 10, 1998, pp. 1-2.

Kortuem, et al. Context Aware, Adaptive, Wearable Computers as Remote Interfaces to Intelligent Environments. University of Oregon, Oct. 1998, 8 pages.

Kortuem. When Cyborgs Meet: Building Communities of Cooperating Wearable Agents. Third International Symposium on Wearable Computers, Oct. 18-19, 1999, San Francisco, California.

"LabVIEW User Manual," Jan. 1998 Edition, National Instruments. http://claymore.engineer.gvsu.edu/eod/courses/egr450/media/320999b.pdf. Last accessed Dec. 7, 2008, 514 pages.

Lashkari, et al. Collaborative Interface Agents. Proceedings of AAAI'94 Conference, Seattle, Washington, Aug. 1994.

Lehikoinen, et al. MEX: A Distributed Software Architecture for Wearable Computers. Third International Symposium on Wearable Computers, Oct. 18-19, 1999, San Francisco, California.

Leonhardi, et al. Virtual Information Towers—A Metaphor Intuitive, Location-Aware Information Access in a Mobile Environment. Third International Symposium on Wearable Computers, Oct. 18-19, 1999, San Francisco, California.

Leonhardt, et al. "Multi-Sensor Location Tracking." Department of Computing, London, UK, Oct. 1998.

Losee, Jr. Minimizing information overload: the ranking of electronic messages, Journal of Information Science 15, Elsevier Science Publishers B.V., 1989, pp. 179-189.

Lunt, et al. Knowledge-Based Intrusion Detection. Proceedings of the Annual Artificial Intelligence Systems in Government Conference, IEEE Comp. Soc. Press, vol. Conf.4, 1989, pp. 102-107.

Maes. Agents That Reduce Work and Information Overload. Communications of the ACM, vol. 37, No. 7, Jul. 1994.

Mann. Smart Clothing: Wearable Multimedia Computing and Personal Imaging to Restore the Technological Balance Between People and Their Environments. ACM Multimedia, Nov. 1996, pp. 163-174.

Metz. MIT: Wearable PCs, Electronic Ink and Smart Rooms. PC Magazaine, pp. 192-193, Jun. 1998.

Mott, et al. "A Formalism for Context Mediation Based on Feature Logic." Feb. 1998. http://citeseerx.ist.psu.edu/viewdoc/summary?doi=10.1.1.52.4473. Last accessed Dec. 10, 2008, 11 pages.

Ni. "Attribute Name Evaluation and Its Implementation," School of Computing and Mathematics, Deakin University, Geelong, Victoria, May 16, 1994. http://www.deakin.edu.au/scitech/sit/dsapp/archive/techreport/TR-C94-10.pdf. Last accessed Dec. 9, 2008, 32 pages.

OA Dated Jul. 29, 2008 for U.S. Appl. No. 10/984,511, 28 pages.

OA Dated Aug. 1, 2008 for U.S. Appl. No. 11/179,822, 17 pages.

OA Dated Aug. 14, 2008 for U.S. Appl. No. 10/981,941, 14 pages.

OA Dated Sep. 15, 2008 for U.S. Appl. No. 11/033,974, 17 pages.

OA Dated Sep. 17, 2008 for U.S. Appl. No. 09/894,642, 28 pages.

Spreitzer, et al. Architectural Considerations for Scalable, Secure, Mobile Computing with Location Information, In The 14th International Conference on Distributed Computing Systems, Jun. 1994, pp. 29-38.

Spreitzer, et al. "Providing Location Information in a Ubiquitous Computing Environment," Xerox Palo Alto Research Center, ACM, 1993, pp. 270-283. http://www.comp.lancs.ac.uk/computing/staff/kc/Lecturing/MSc/wk10/p270-spreitzer.pdf. Last accessed Dec, 9, 2008, 14 pages.

Spreitzer et al. Scalable, Secure, Mobile Computing with Location Information, Communications of the ACM, Jul. 1993, 1 page, vol. 36—No. 7.

Starner, et al. Visual Contexual Awareness in Wearable Computing. Media Lab, MIT, Oct. 1998.

Starner. Wearable Computing and Contextual Awareness, Massachusetts Institute of Technology, Jun. 1999, 248 pages.

Tan, et al. Tactual Displays for Wearable Computing, IEEE, MIT Media Laboratory, pp. 84-88, 1997.

Theimer, et al. Operating System Issues for PDAs, In Fourth Workshop on Workstation Operating Systems, 1993, 7 pages.

The MIT Wearable Computing Web Page. http://wearable.www.media.mit.edu/projects/wearables/. Last accessed Feb. 10, 1998, pp. 1-3.

T. Joachims, Text categorization with support vector machines: learning with many relevant features, Machine Learning, European Conference on Machine Learning, Apr. 21, 1998, pp. 137-142.

Wachowicz, et al. "Combining Location and Data Management in an Environment for Total Mobility," University of Cambridge, England, 1996. http://citeseerx.ist.psu.edu/viewdoc/summary?doi=10.1.1.37.4550. Last accessed Dec. 9, 2008, 12 pages.
Want, Active Badges and Personal Interactive Computing Objects, IEEE Transactions on Consumer Electronics, 1992, 11 pages, vol. 38—No. 1.
Want, et al., The Active Badge Location System, ACM Transactions on Information Systems, Jan. 1992, pp. 91-102, vol. 10—No. 1.
Wardell. "Stardock.net Releases WindowBlinds." Stardock.net, Inc. Oct. 4, 1999, http://stardock.net/media/pr_wb10.html. Last accessed Dec. 9, 2008, 2 pages.
Wearable Computer Systems for Affective Computing. http://www.media.mit.edu/affect/AC_research/wearables.html. Last accessed Feb. 10, 1998, pp. 1-5.
Weiser. Some Computer Science Issues in Ubiquitous Computing, Communications of the ACM, Jul. 1993, pp. 75-84, vol. 36—No. 7.
Weiser. The Computer for the 21st Century, Scientific American, Sep. 1991, 8 pages.
Yang. SmartSight: A Tourist Assistant System. Third International Symposium on Wearable Computers, Oct. 18-19, 1999, San Francisco, California.
Zenel, et al. "A General Purpose Proxy Filtering Mechanism Applied to the Mobile Environment," Proceedings of the 3rd annual ACM/IEEE international conference on Mobile computing and networking, MOBICOM'97, Budapest, Hungary, pp. 248-259. http://portal.acm.org/citation.cfm?id=262153. Last accessed Dec. 9, 2008, 12 pages.
Aoki, et al. Realtime Personal Positioning System for a Wearable Computer. Third International Symposium on Wearable Computers, San Francisco, California, Oct. 18-19, 1999.
"BridgeVIEW and LabVIEW G Programming Reference Manual," Jan. 1998, Nathional Instruments Corporation. http://www.ni.com/pdf/manuals/321296b.pdf. Last accessed Dec. 7, 2008, 667 pages.
OA Dated Oct. 30, 2008 for U.S. Appl. No. 11/490,540, 37 pages.
OA Dated Nov. 28, 2008 for U.S. Appl. No. 11/761,210, 11 pages.
OA Dated Dec. 3, 2008 for U.S. Appl. No. 09/981,320, 40 pages.
OA Dated Dec. 4, 2008 for U.S. Appl. No. 11/567,902, 21 pages.
Oakes. The Truman Show Realized? http://www.wired.com/news/news/technology/story115745.html. Last accessed Feb. 10, 1998, pp. 1-4.
Ockerman, et al. "Wearable Computer for Performance Support: Initial Feasibility Study," International Symposium in Wearable Computers, Oct. 1997, pp. 10-17.
Papakonstantinou, et al. "MedMaker: A Mediation System Based on Declarative Specifications." 1995. http://citeseerx.ist.psu.edu/viewdoc/summary?doi=10.1.1.35.735. Last accessed Nov. 25, 2008, 10 pages.
Picard, et al. Affective Wearables. Personal Technologies vol. 1, 231-240, MIT Media Laboratory (1997).
Rekimoto, et al. The World Through the Computer: Computer Augmented Interaction with Real World Environments, ACM, Nov. 1995, pp. 29-36.
Research Areas in Affective Computing. Http://www.media.mit.edu/affect/. Last accessed Feb. 10, 1998, p. 1.
Research on Affective Pattern Recognition and Modeling. Http://www.media.mit.edu/affect/AC_research/recognizing.html. Last accessed Feb. 10, 1998, pp. 1-4.
Research on Sensing Human Affect. Http://www.media.mit.edu/affect/AC_research/sensing.html. Last accessed Feb. 10, 1998, pp. 1-5.
Rhodes, Remembrance Agent: A continuously running automated information retrieval system, The Proceedings of The First International Conference on The Practical Application Of Intelligent Agents and Multi Agent Technology, 1996, pp. 487-495.
Rhodes, The Wearable Remembrance Agent: A System for Augmented Memory, Personal Technologies Journal Special Issue on Wearable Computing, 1997, 12 pages.
Rhodes. The Wearable Rememberance Agent: A System for Augmented Memory. Proceedings of the First International Symposium on Wearable Computers (ISWC'97), Cambridge, MA, Oct. 13-14, 1997.
Rhodes. WIMP Interface Considered Fatal. http://rhodes.www.media.mit.edu/people/rhodes/Papers/no-wimp.html. Last accessed Feb. 10, 1998, pp. 1-3.
Rogers, et al. Outbreak Agent: Intelligent Wearable Technology for Hazardous Environments. IEEE International Conference, Orlando, Florida, Oct. 12-15, 1997, pp. 3198-3203. http://citeseerx.ist.psu.edu/viewdoc/summary?doi=10.1.1.46.8827. Last accessed Nov. 25, 2008, 6 pages.
Rosis, et al. "Adaptive Interaction with Knowledge-Based System," ACM 1994.
Sato, et al. Autonomous Behaviour Control of Virtual Actors Based on the Air Model. Proceedings Computer Animation, Jun. 5, 1997.
Schilt. A System Architecture for Context-Aware Mobile Computing, Columbia University, 1995, 153 pages.
Schilit, et al., Context-Aware Computing Applications, In Proceedings of the Workshop on Mobile Computing Systems and Applications, Dec. 1994. pp. 85-90.
Schilit, et al., Customizing Mobile Applications, Proceedings USENIX Symposium on Mobile and Location Independent Computing, Aug. 1993, 9 pages.
Schilit, et al., Disseminating Active Map Information to Mobile Hosts, IEEE Network, 1994, pp. 22-32, vol. 8—No. 5.
Schilit, et al., The ParcTab Mobile Computing System, IEEE WWOS-IV 1993, 4 pages.
Schmidt, et al. "There's More to Context Than Location." Proceedings of the International Workshop on Interactive Applications of Mobile Computing (IMC98), Germany, Nov. 1998, 10 pages. http://citeseer.comp.nus.edu.sg/cache/papers/cs/16114/http:zSzzSzwww.teco.eduzSz~albrechtzSzpublicationzSzdraft_docszSzcontext-is-more-than-location.pdf/there-is-more-to.
Schneider, et al. Modeling Wearable Negotiation in an Opportunistic Task Oriented Domain. Third International Symposium on Wearable Computers, Oct. 18-19, 1999, San Francisco, California.
Smailagic, et al. Matching Interface Design with User Task: Modalities of Interaction with CMU Wearable Computers. IEEE Personal Communications, Feb. 1996, pp. 14-25.
Smailagic, et al. MoCCA: A Mobile Communication and Computing Architecture. Third International Symposium on Wearable Computers, Oct. 18-19, 1999, San Francisco, California.
SmartDesk Home Page. http://vismod.www.media.mit.edu/vismod/demos/smartdesk/. Last accessed Feb. 10, 1998, pp. 1-4.
Smart Rooms. http://vismod.www.media.mit.edu/vismod/demos/smartroom/. Last accessed Feb. 10, 1998, pp. 1-3.
[No Author Listed] "Haptics," http://www.ai.mit.edu/projects/handarm-haptics/haptics.html, pp. 1-2 (Accessed Oct. 2, 1998).
Bates et al., Middleware Support for Mobile Multimedia Applications, ICL System Journal, Nov. 1997, 20 pages.
Cochran, "The Development of Wearable Clothing," Dr. Dobbs, online edition, pp. 1-2, Aug. 11, 2000.
Cugola et al., Exploiting an Event-Based Infrastructure to Develop Complex Distributed Systems, 20th International Conference on Software Engineering (ICSE'98) Apr. 1998, p. 261-70, 10 pages.
Dechamboux et al., Using a Distributed Shared Memory for Implementing Efficient Information Mediators, Proceedings of the International Conference and Exhibition on High-Performance Computing and Networking, Apr. 1996, 5 pages.
Dey et al., CyberDesk: A Framework for Providing Self-Integrating Context-Aware Services, Knowledge-Based Systems, 11:3-13, 1998, 10 pages.
European Office Action dated Feb. 13, 2009 for EP Application No. 01964695.9, 4 pages.
Goharian et al., Enterprise Text Processing: A Sparse Matrix Approach, 2001, IEEE, pp. 71-75.
Han, et al., "DBMiner: A System for Mining Knowledge in Large Relational Database,"Proceedings 1996 International Conference on Data Mining and Knowledge Discovery, Portland, OR, Aug. 1996. http://www.cs.ualberta.ca/'zaiane/postscript/kdd96.pdf. Last accessed Dec. 9, 2008, 6 pages.
International Search Report, Application No. PCT/US01/10599, Nov. 28, 2002.
International Search Report, PCT/US01/10538, Aug. 14, 2002, 2 pages.
Ockerbloom, Mediating Among Diverse Data Formats: Thesis Summary, PhD Thesis, Technical Report CMU-CS-98-102, Department of Computer Sciences, Carnegie Mellon University, Pittsburgh, PA, Jan. 14, 1998, 15 pages.

Pascoe, Adding Generic Contextual Capabilities to Wearable Computers, Proceedings of the 2nd International Symposium on Wearable Computers (ISWC '98), Pittsburgh, PA, Oct. 19-20, 1998, 8 pages.

Salber et al., The Design and Use of a Generic Context Server. Technical Report GIT-GVU-98-32. GVU Center, College of Computing, Georgia Institute of Technology. 1998. Available at ftp://ftp.cc.gatech.edu/pub/gvu/tr/1998/98-32.pdf. Last accessed Mar. 12, 2010.

Sawhney, Contextual awareness, messaging and communication in nomadic audio environments, Massachusetts Institute of Technology, Jun. 1998 pp. 80-105, 25 pages.

Starovic, An Event Based Object Model for Distributed Programming, Technical Report TCD-CS-95-28, Dept. of Computer Science, Trinity College Dublin, Ireland, 1995, retrieved from http://citeseer.ist.psu.edu/starovic95event.html, 15 pages.

* cited by examiner

New Inspection     Inspection Info     Comments

INSPECTION INFO

1 Customer Name
2 Customer Phone
3 Customer Address
4 Customer City
5 [Customer State]
6 Customer Zip
7 Inspector Name
8 Inspection Date
9 Comments Customer Name: Bob Smith
Customer Phone: 555-1212
Customer Address: 123 Main St.
Customer City: Seattle
Customer State: _____
Customer Zip: _____
Inspector Name: _____
Inspection Date: _____
Comments: _____

*Fig. 6*

INSPECTION INFO

Page Up △

1 Customer Name
2 Customer Phone
3 Customer Address
4 Customer City
5 [Customer State]
6 Customer Zip
7 Inspector Name
8 Inspection Date
9 Comments Page Down ▽

Customer Name: Bob Smith
Customer Phone: 555-1212
Customer Address: 123 Main St.
Customer City: Seattle
Customer State: _____
Customer Zip: _____
Inspector Name: _____
Inspection Date: _____
Comments: _____

New Inspection   [Inspection Info]

JOHN
INVENTORY PARTS    ASSEMBLE INTAKE    LUBRICATE CORE

JAMIE
LUBRICATE CORE    INSTALL INTAKE    VERIFY CHARGE

MAX
LUBRICATE CORE    INSTALL INTAKE    VERIFY CHARGE

CAROL
INSTALL INTAKE    VERIFY CHARGE    RUN DIAGNOSTICS

INVENTORY    ASSEMBLE    LUBRICATE    INSTALL    VERIFY    RUN

DYNAMICALLY DISPLAYING CURRENT STATUS OF TASKS

RELATED APPLICATIONS

This application is a continuation of co-pending U.S. patent application No. 09/879,829 filed Jun. 11, 2001 and entitled "Dynamically Displaying Current Status of Tasks", which is hereby incorporated by reference, and which claims the benefit under 35 USC 119(e) of U.S. Provisional Application No. 60/240,685, filed Oct. 16, 2000, entitled "Method for Dynamically Displaying the Current Status of Tasks".

TECHNICAL FIELD

The present invention is directed to graphical user interfaces and more particularly to dynamically displaying the current status of tasks.

BACKGROUND

As computers become increasingly powerful and commonplace, they are being used for an increasingly broad variety of tasks. For example, in addition to traditional activities such as running word processing and database applications, computers are increasingly becoming an integral part of users' daily lives. Programs to schedule activities, generate reminders, and provide rapid communication capabilities are becoming increasingly popular. Moreover, computers are increasingly present during virtually all of a person's daily activities. For example, hand-held computer organizers (e.g., PDAS) are increasingly common, and communication devices such as portable phones are increasingly incorporating computer capabilities. More recently, the field of wearable computers (e.g., with eyeglass displays) has begun to expand, creating a further presence of computers in people's daily lives.

Computers often progress through a particular series of steps when allowing a user to accomplish a particular task. For example, if a user desires to enter a new name and address to an electronic address book, the computer progresses through a series of steps prompting the user to enter the desired information (e.g., name, street address, city, state, zip code, phone number, etc.). On computers with large displays (e.g., typical desktop computers), sufficient area exists on the display to provide an informative and useable user interface (UI) that allows the user to enter the necessary data for the series of steps. However, problems exist when attempting to guide the user through the particular series of steps on smaller displays. Without the large display area, there is frequently insufficient room to provide the prompts in the same informative and useable manner.

Additionally, the nature of many new computing devices with small displays (e.g., PDAs and wearable computers) is that the computing devices are transported with the user. However, traditional computer programs are not typically designed to efficiently present information to users in a wide variety of environments. For example, most computer programs are designed with a prototypical user being seated at a stationary computer with a large display device, and with the user devoting fill attention to the display. In that environment, the computer program can be designed with the assumption that the user's attention is predominately on the display device. However, many new computing devices with small displays can be used when the user's attention is more likely to be diverted to some other task (e.g., driving, using machinery, walking, etc.). Many traditional computer programs, designed with large display devices in mind, frequently do not allow the user to quickly and easily reorient him- or her-self to the task being carried out by the computer. For example, if the user is performing a task by following a series of steps on a wearable computer, looks away from the display to focus his or her attention on crossing a busy intersection, and then returns to the task, it would be desirable for the user to be able to quickly and easily reorient him- or her-self to the task (in other words, readily know what steps he or she has accomplished so far and what the next step to be performed is).

Accordingly, there is a need for new techniques to display the current status of tasks to a user.

SUMMARY

Dynamically displaying current status of tasks is described herein.

According to one aspect, a list of items corresponding to tasks that are to be performed are displayed. The tasks may be performed by a user (e.g., data entered by the user, words spoken by the user, actions taken by the user, and so forth) or alternatively by a computer (e.g., the steps followed in carrying out a programmed task). At least a portion of the list is displayed at any given time along with an indication of which task is the next task to be performed. As the user progresses through the set of tasks, the current status of his or her progression through the corresponding items on the list is dynamically updated so as to readily inform the user (or someone else) as to what the current task is that needs to be performed, as well as what tasks have already been performed and/or what tasks remain to be performed.

According to another aspect, only a subset of the list of items is displayed at any given time. The list is scrolled through as the tasks are performed so that different items are displayed as part of the subset as tasks are performed.

According to another aspect, multiple lists of tasks to be performed by multiple individuals (or computing devices) are displayed on a display of the user. As the multiple individuals (or computing devices) finish the tasks in their respective lists, an indication of such completion is forwarded to the user's computer, which updates the display to indicate the next task in the list to be displayed. The user is thus able to monitor the progress of the multiple individuals (or computing devices) in carrying out their respective tasks.

BRIEF DESCRIPTION OF THE DRAWINGS

The present invention is illustrated by way of example and not limitation in the figures of the accompanying drawings. The same numbers are used throughout the figures to reference like components and/or features.

FIGS. 6 and 7 illustrate alternative displays of the item list and current location identifiers with reference to a sequence of tasks to be completed in order to record a new inspection (e.g., a building inspection).

FIG. 9 illustrates an exemplary group of lists that may be displayed for the distributed environment of FIG. 8.

DETAILED DESCRIPTION

Dynamically displaying the current status of tasks is described herein. A list of items or prompts that is to be traversed by a user in a particular order is displayed to the user (e.g., a set of tasks the user is to perform in a particular sequence as part of his or her job, a set of words to be spoken, a list of questions or fields to be answered, and so forth). At least a portion of the list is displayed at any given time along with an indication of which item in the list is the next item that the user needs to handle (e.g., the next task to perform, the next word to speak, the next question to answer, and so forth). As the user progresses through the list of tasks, the current status of his or her progression through the prompts on the list is dynamically updated so as to readily inform the user as to what the current task is that needs to be performed, as well as what tasks have already been performed and/or what tasks remain to be performed.

Figure 1:
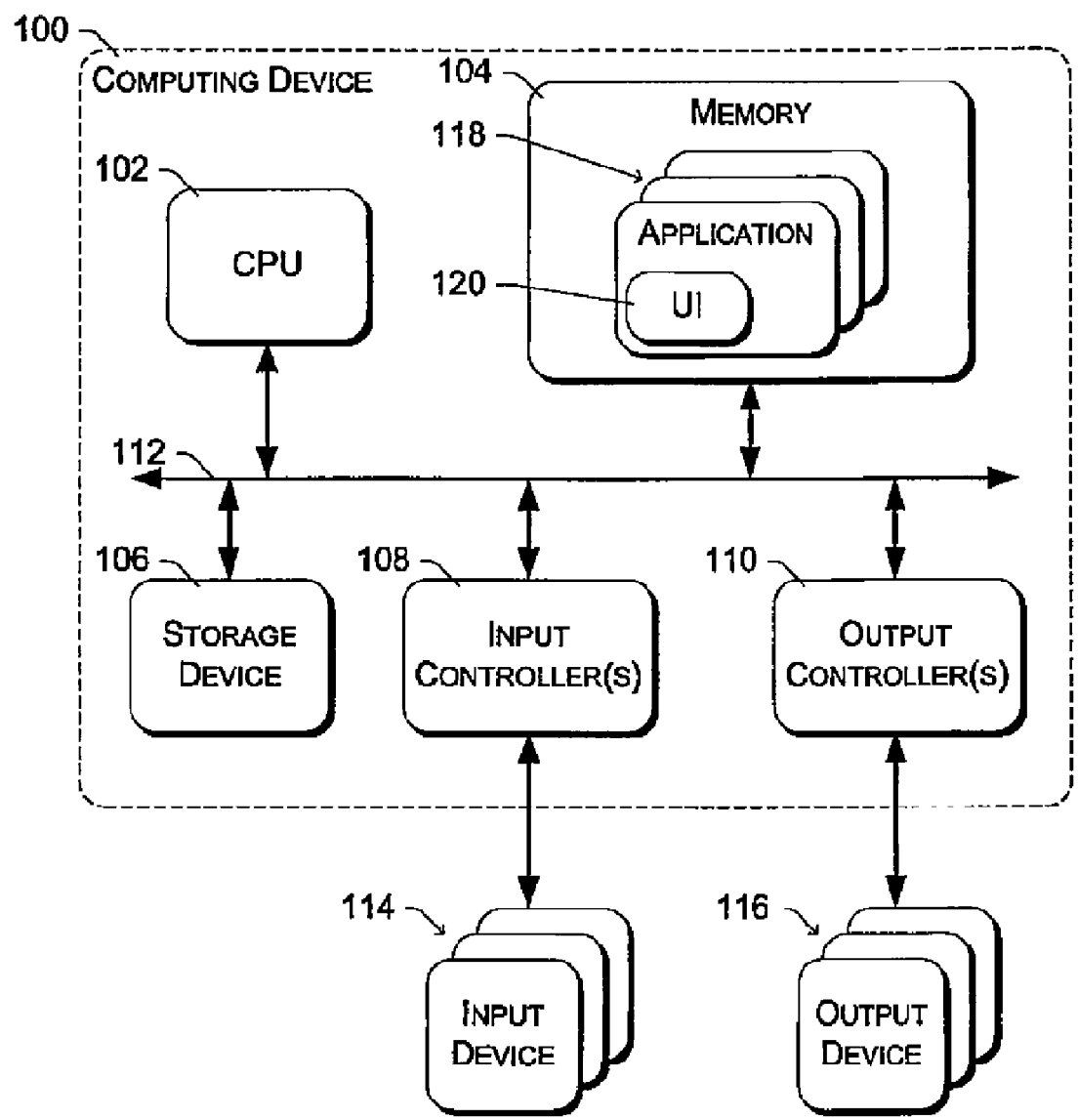
FIG. 1 illustrates an exemplary computing device such as may be used in accordance with certain embodiments of the invention.

FIG. 1 illustrates an exemplary computing device 100 such as may be used in accordance with certain embodiments of the invention. Computing device 100 represents a wide variety of computing devices, such as wearable computers, personal digital assistants (PDAs), handheld or pocket computers, telephones (e.g., cell phones), laptop computers, gaming consoles or portable gaming devices, desktop computers, Internet appliances, etc. Although the dynamic displaying of current status of tasks described herein is particularly useful if computing device 100 has a small display, any size display may be used with the invention.

Computing device 100 includes a central processing unit (CPU) 102, memory 104, a storage device 106, one or more input controllers 108, and one or more output controllers 110 (alternatively, a single controller may be used for both input and output) coupled together via a bus 112. Bus 112 represents one or more conventional computer buses, including a processor bus, system bus, accelerated graphics port (AGP), universal serial bus (USB), peripheral component interconnect bus (PCI), etc.

Memory 104 may be implemented using volatile and/or non-volatile memory, such as random access memory (RAM), read only memory (ROM), Flash memory, electronically erasable programmable read only memory (EPROM), disk, and so forth. Storage device 106 is typically implemented using non-volatile "permanent" memory, such as ROM, EEPROM, magnetic or optical diskette, memory cards, and the like.

Input controller(s) 108 are coupled to receive inputs from one or more input devices 114. Input devices 114 include any of a variety of conventional input devices, such as a microphone, voice recognition devices, traditional qwerty keyboards, chording keyboards, half qwerty keyboards, dual forearm keyboards, chest mounted keyboards, handwriting recognition and digital ink devices, a mouse, a track pad, a digital stylus, a finger or glove device to capture user movement, pupil tracking devices, a gyropoint, a trackball, a voice grid device, digital cameras (still and motion), and so forth.

Output controller(s) 110 are coupled to output data to one or more output devices 116. Output devices 116 include any of a variety of conventional output devices, such as a display device (e.g., a hand-held flat panel display, an eyeglass-mounted display that allows the user to view the real world surroundings while simultaneously overlaying or otherwise presenting information to the user in an unobtrusive manner), a speaker, an olfactory output device, tactile output devices, and so forth.

One or more application programs 118 are stored in memory 104 and executed by CPU 102. When executed, application programs 118 generate data that may be output to the user via one or more of the output devices 116 and also receive data that may be input by the user via one or more of the input devices 114. For discussion purposes, one particular application program is illustrated with a user interface (UI) component 120 that is designed to present information to the user including dynamically displaying the current status of tasks as discussed in more detail below.

Although discussed herein primarily with reference to software components and modules, the invention may be implemented in hardware or a combination of hardware, software, and/or firmware. For example, one or more application specific integrated circuits (ASICs) could be designed or programmed to carry out the invention.

Figure 2:
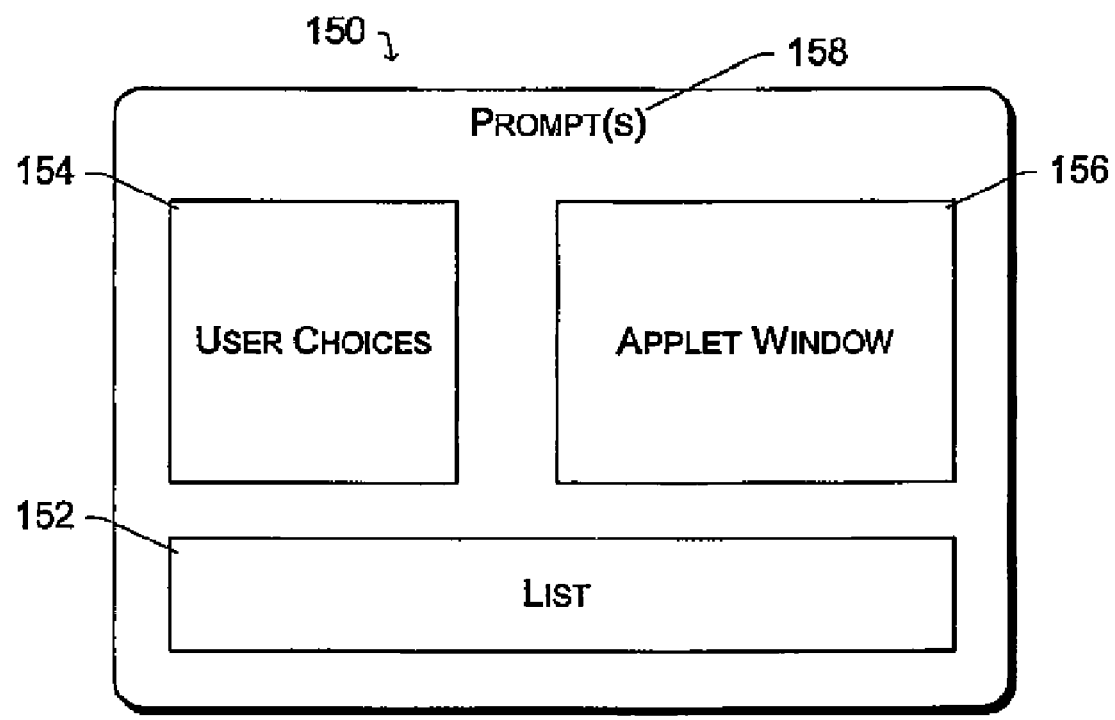
FIG. 2 illustrates an exemplary user interface display in accordance with certain embodiments of the invention.

FIG. 2 illustrates an exemplary user interface display in accordance with certain embodiments of the invention. User interface display 150 can be, for example, the display generated by user interface 120 of FIG. 1. UI display 150 includes an item or prompt list portion 152, a user choices portion 154, and an applet window portion 156. Additional labels or prompts 158 may also be included (e.g., a title for the task being handled, the current time, the amount of time left to finish the task, etc.). List portion 152 displays a list that prompts the user of tasks that are to be handled by the user in a particular order. An indication is also made to the user within list portion 152 of where the user currently is in that list (that is, what the next item or task is that needs to be handled by the user), and also identifies items or tasks (if any) that have already been handled by the user as well as future items or tasks (if any) that need to be handled by the user. The manner in which an item or task is handled by the user is dependent on the nature of the list, as discussed in more detail below.

User choices portion 154 displays the options for the user to select from based on the next item or task in the list that needs to be handled by the user. For example, assume that the list in portion 152 is a list prompting the user regarding what information needs to be gathered in order for the user to set up a meeting with a potential customer. The list of prompts in list portion 152 could be a list of tasks the user must perform— that is, a list of information that needs to be collected (e.g., the customer's name, the location of the meeting, the time of the meeting, and so forth). If we further assume that the current task that needs to be handled by the user is entry of the location of the meeting, user choices portion 154 could display the various permissible inputs for the location of the meeting (e.g., at the user's main office, at a remote office, at the customer's facility, and so forth).

By way of another example, the item list may be a list of prompts for the information to be verbally input by the user in each step, with user choices portion 154 displaying a list of which words can be spoken in each step.

Applet window portion 156 displays additional information clarifying or amplifying the choices in user choices portion 154 (or the current item or task in item list portion 152). Following the previous example, if the current task that needs to be handled by the user is entry of the location of the meeting, applet window portion 156 could display additional descriptive information for one or more of the permissible inputs for the location of the meeting (e.g., a street address, a distance from the user's home, a map flagging the locations of the various meeting locations, and so forth).

The list displayed in list portion 152 is a list of items that is to be traversed by a user in a particular order. This can be a list of task prompts regarding tasks that the user is to perform, a list of tasks prompts regarding tasks to be performed by another user or computer, and so forth. Any of a wide variety of lists can be displayed, such as a set of tasks the user is to perform in a particular sequence as part of his or her job (this can be used, for example, to assist in training users to do their jobs), a set of tasks the user is to perform in a particular sequence in order to assemble or install a product he or she has purchased, a set of words to be spoken (e.g., queues as to what voice inputs the user is to make in order to carry out a task), a list of questions or fields to be answered, and so forth. Alternatively, the list of items may be a list of tasks or steps to be performed by a computer or computer program. Such a list can be used, for example, by a user to track the process of the computer or program in carrying out the particular sequence of steps. Additionally, depending on the nature of the sequence of tasks being performed, multiple lists of items may be displayed (e.g., a multi-tiered item list). Situations can arise in which the list of items or prompts is too large to be displayed in its entirety. In such situations, only a portion of the list is displayed (e.g., centered on the item or prompt for the next task to be performed). This subset of the steps to be performed is then scrolled as tasks are completed, resulting in a dynamic list display that changes when a task is completed.

By displaying the list of prompts (or at least a portion thereof), the user is able to readily identify the status of the set of tasks being performed (in other words, the user is also able to obtain a feel for where he or she is (or where the user or computer being monitored is) in progressing through the sequence of tasks). The user is able to quickly identify one or more previous tasks (if any) in the sequence, as well as one or more future tasks (if any) in the sequence. Such information is particularly helpful in reorienting the user to the sequence of tasks if his or her attention has been diverted away from the sequence. For example, the user's attention may be diverted away from the sequence to answer questions from another employee. After answering the question, the user can look back at display 150 and quickly reorient him- or her-self into the sequence of tasks being performed.

Item lists may be a set of predetermined items, such as a particular set of steps to be followed to assemble a machine or a set of words to be uttered to carry out a task for a speech-recognizing computer. Alternatively, item lists may be dynamic, changing based on the user's current location, current activity, past behavior, etc. For example, computer 100 of FIG. 1 may detect where the user is currently located (e.g., in his or her office, in the assembly plant, which assembly plant, etc.), and provide the appropriate instructions to perform a particular task based on that current location. Additional information regarding detecting the user's current context (e.g., current location, current activity, etc.) can be found in a co-pending U.S. patent application Ser. No. 09/216,193, entitled "Method and System For Controlling Presentation of Information To a User Based On The User's Condition", which was filed Dec. 18, 1998, and is commonly assigned to Tangis Corporation. This application is hereby incorporated by reference.

Figure 3:
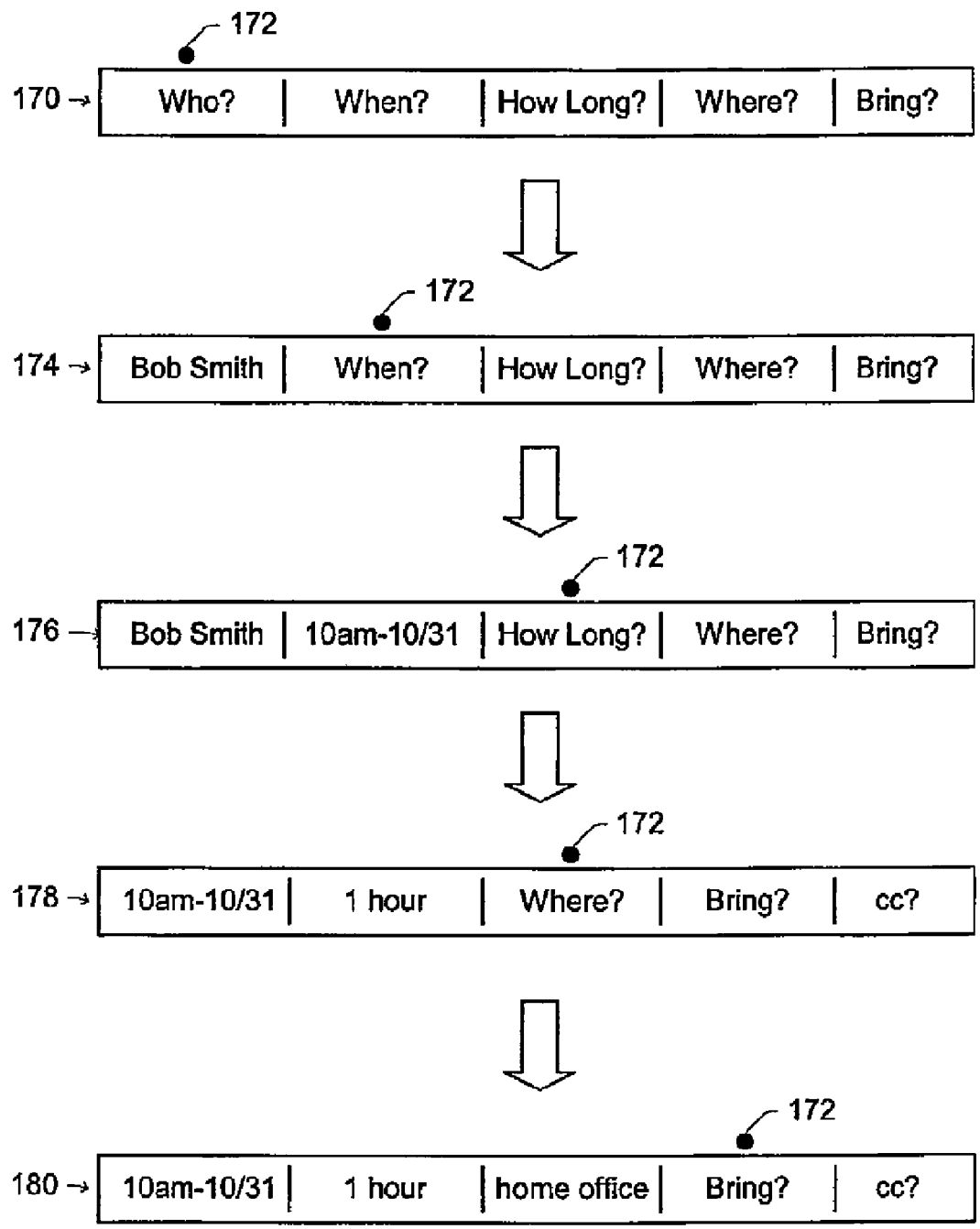
FIG. 3 illustrates an exemplary display of an item list and current location marker such as may be used in accordance with certain embodiments of the invention.

FIG. 3 illustrates an exemplary display of an item list and current location marker such as may be used in accordance with certain embodiments of the invention. Assume that the sequence of items on the list is a set of prompts regarding information that needs to be supplied by the user in order to schedule a meeting. In the illustrated example, this list includes the following information: who the meeting is with (who), the date and time for the meeting (when), the duration of the meeting (how long), the location of the meeting (where), an indication of any materials to bring to the material (bring), and an indication of anyone else that should be notified of the meeting (cc).

FIG. 3 illustrates an example item list displayed in list portion 152 of FIG. 2. Initially, the item list 170 is displayed, including the following prompts: "who?", "when?", "how long?", "where?", and "bring?". The prompts in list 170 provide a quick identification to the user of what information he or she needs to input for each task in the sequence of tasks for scheduling a meeting. Due to the limited display area, list 170 does not include the prompts for each step in the sequence, but rather scrolls through the prompts as discussed in more detail below. A current location marker 172 is also illustrated in FIG. 3 to identify to the user what the current step is in the sequence. Assuming the meeting scheduling process has just begun, the first step in the sequence is to identify who the meeting is with (who), which is identified by current location marker 172 being situated above the prompt "who?". In the illustrated example, location marker 172 is a circle or ball. Alternatively, other types of presentation changes may be made to alter the appearance of a prompt (or area surrounding a prompt) in order to distinguish the current step from other steps in the sequence. For example, different shapes other than a circle or ball may be used for a location marker, the text for the prompt may be altered (e.g., a different color, a different font, a different size, a different position on screen (e.g., slightly higher or lower than other prompts in the list), and so forth), the display around the prompt may be altered (e.g., the prompt may be inverted so that it appears white on a black background rather than the more traditional black on a white background, the prompt may be highlighted, the prompt may be encircled by a border, and so forth), etc. Those skilled in the art can easily determine a variety of alternate methods for marking the current step.

Figure 4A:
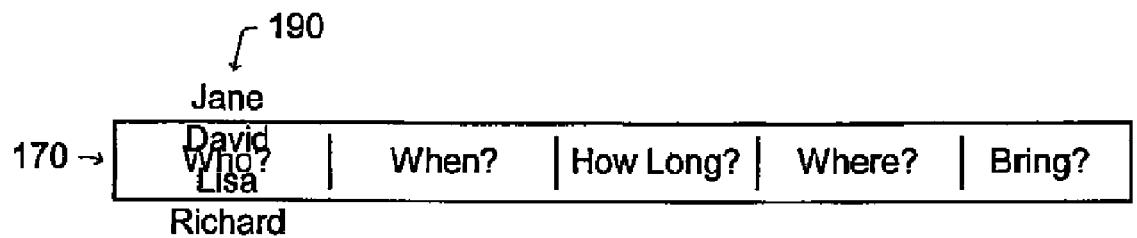
FIGS. 4A and 4B illustrates different ways in which the prompt in a sequence can be changed.
Figure 4B:
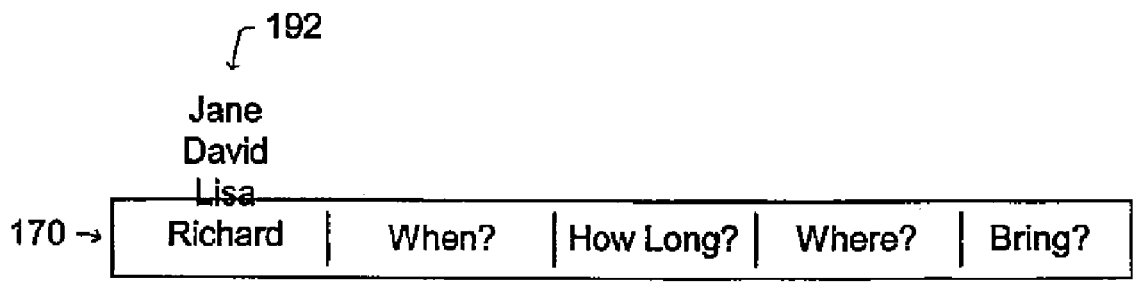

One additional presentation change that can be made to distinguish the current step from other steps in the sequence is to change the prompt itself. The prompt could be replaced with another prompt, or another prompt could be superimposed on the prompt for the current step. For example, the user may have a set of individuals that he or she typically meets with, and these may be superimposed on the "who?" prompt when it is the current step. FIGS. 4A-4B illustrates different ways in which the prompt in a sequence can be changed. FIG. 4A illustrates an example item list with the prompt for the current step in the sequence being superimposed with various input options. A list 190 is illustrated and the current step is to input who the meeting is to be with (the "who?" prompt). As illustrated, a set of common people that the user schedules meetings with (Jane, David, Lisa, and Richard) are superimposed on the "who?" prompt. The appearance of the underlying prompt "who?" may be changed (e.g., shadowed out, different color, etc.) in order for overlying input options to be more easily viewed. It is to be appreciated that the exact location of the superimposed set of input options can vary (e.g., the characters of one or more input options may overlap the prompt, or be separated from the prompt).

FIG. 4B illustrates an example item list with the prompt for the current step in the sequence being replaced by the set of input options. A list 192 is illustrated and the current step is to input who the meeting is to be with (the "who?" prompt). However, as illustrated, the "who?" prompt is replaced with a set of common people that the user schedules meetings with (Jane, David, Lisa, and Richard).

The user is thus given an indication of both the current step in the sequence as well as common responses to that step. The type of information that is superimposed on or replaces the prompt can vary based on the current step. For example, when the "when?" prompt is the current step it may have superimposed thereon the times that the user is available for the current day (or current week, and so forth).

Returning to FIG. 3, once the user enters the information identifying who the meeting is with (assume for purposes of this example the meeting is with Bob Smith), list 170 is changed to list 174 in which the prompt "who?" is replaced with the name "Bob Smith" and the current location marker 172 is changed to indicate the next prompt ("when?") is the current task that needs to be handled by the user. Assuming the user inputs that the meeting is to occur at 10 am on October 31, list 174 is changed to list 176 in which the prompt "when?" is replaced with the date and time of the meeting, and the current location marker 172 is changed to indicate the next prompt ("how long?") is the current task that needs to be handled by the user. Thus, as can be seen from lists 172, 174, and 176, the current location marker 172 "bounces" along the list from item to item, making the user readily aware of what the current task is that he or she should be performing (that is, which data he or she should be inputting in the present example).

Once the user inputs the duration of the meeting, list 176 is changed to list 178. Given the limited display area, the user interface now scrolls the list so that the leftmost item is no longer shown but a new item is added at the right. Thus, the identification of "Bob Smith" is no longer shown, but a prompt for who else should be notified of the meeting ("cc?") is now shown. Once the user enters the location for the meeting ("home office"), list 178 is changed to list 180 and current location marker 172 is changed to indicate the next prompt ("bring?") is the current task that needs to be handled by the user. Thus, as can be seen with lists 176, 178, and 180, current location marker 172 may not be moved in response to an input but the list may be scrolled.

Thus, as can be seen in FIG. 3, the item list provides a series of prompts identifying what tasks (if any) in the sequence have already been performed and what tasks (if any) remain to be performed. For those tasks that have already been performed, an indication is made in the list as to what action was taken by the user for those tasks (e.g., what information was entered by the user in the illustrated example). Thus, the user can readily orient him- or her-self to the sequence of steps, even if his or her attention is diverted from the display for a period of time. Alternatively, the prompts in the list need not be changed when the user enters the data (e.g., "who?" need not be replaced by "Bob Smith"). The data input by the user can alternatively be displayed elsewhere (e.g., in applet window portion 156).

One advantage of the item lists described herein is that the lists present the multiple steps or items in a concise manner—these steps or items can also be referred to as idioms. When these idioms are presented together in a sequence, the provide more information to the user than when presented in independent form. For example, the idiom "bring?" by itself does not present as much information to the user as the entire sequence of idioms "who?", "when?", "how long?", "where?", and "bring?".

The use of item lists as described herein also allows an individual to "zoom" in (and thus gain more information about) a particular task. For example, with reference to FIG. 3, the user is able to select and zoom in on the "where?" prompt and have additional information about that task displayed (e.g., the possible locations for the meeting). The user is able to "backtrack" through the list (e.g., by moving a cursor to the desired item and selecting it, or using a back arrow key or icon, or changing the current location marker (e.g., dragging and dropping the location marker to the desired item), etc.) and see this additional information for tasks already completed. Alternatively, the "backtracking" may be for navigational rather than informational purposes. Moving back through the list (whether by manipulation of the location marker or in some other manner) may also be used to accomplish other types of operations, such as defining a macro or annotation.

Additionally, by displaying the prompts for future items, the speed of handling of the sequence of the items by the user can potentially be increased. For example, the user can see the prompt for the next one or more items in the list and begin thinking about how he or she is going to handle that particular item even before the computing device is finished processing the input for the item he or she just handled.

According to another embodiment, multiple location markers are displayed along with the item list—one marker identifying the current item to be handled by the user and another marker identifying the current item being processed by the computing device. Situations can arise where the user can input data quicker than it can be processed by the computing device. For example, the user may be able to talk at a faster rate than the computing device is able to analyze the speech.

The use of two such markers can allow the user to identify if the computing device is hung up on or having difficulty processing a particular input (e.g., identify a particular word spoken by the user, misrecognition of the input, improper parsing, etc.), the user can identify this situation and go back to the task the computing device is having difficulty processing and re-enter the speech.

Figure 5:
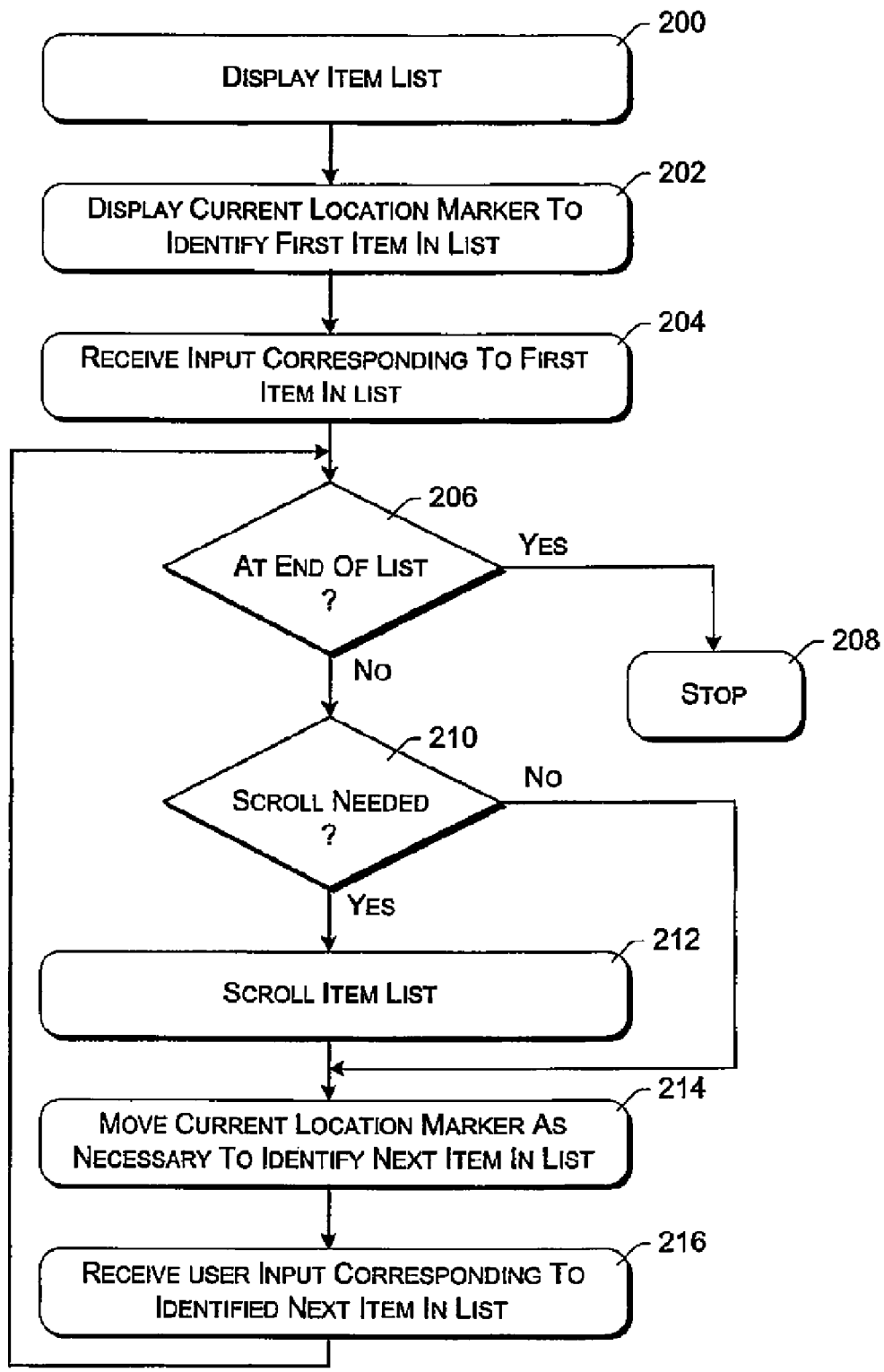
FIG. 5 is a flowchart illustrating an exemplary process for displaying the current status of tasks in accordance with certain embodiments of the invention.

FIG. 5 is a flowchart illustrating an exemplary process for displaying the current status of tasks in accordance with certain embodiments of the invention. The process of FIG. 5 is carried out by the user interface of a computing device (e.g., interface 120 of FIG. 1), and may be performed in software. Although FIG. 5 is discussed with reference to a location marker, it is to be appreciated that any of the presentation changes discussed above an be used to identify items in the list.

Initially, an item list is displayed (act 200), which is a sequence of items or prompts for the user to follow. A current Location marker is also displayed to identify the first item in the list (act 202), and input corresponding to the first item in the list is received (act 204). The nature of this input can vary depending on the sequence of tasks itself (e.g., it may be data input by a user, an indication from another computer program that the task has been accomplished, etc.). A check is then made as to whether the end of the list has been reached (at 206). If the end of the list has been reached then the process stops (act 208), waiting for the next sequence of tasks to begin or for the user to backtrack to a previously completed task.

However, if the end of the list has not been reached, then a check is made as to whether scrolling of the list is needed (act 210). Whether scrolling of the list is needed can be based on a variety of different factors. For example, the user interface may attempt to make sure that there are always at least a threshold number of prompts before and/or after the current location marker, the user interface may attempt to make sure that the current task remains as close to the center of the item list as is possible but that no portions of the item list be left empty, etc. These factors can optionally be user-configurable preferences, allowing the user to adjust the display to his or her particular likes and/or dislikes (e.g., the user may prefer to see more future tasks than previous tasks).

If scrolling is needed, then the item list is scrolled by one item (or alternatively more items) in the appropriate direction (act 212). The amount that the item list is scrolled can vary (e.g., based on the sizes of the different items in the list). The appropriate direction for scrolling can vary based on the activity being performed by the user and the layout of the list (e.g., in the example of FIG. 3, the scrolling is from right to left when progressing forward through the list, and left to right when backtracking through the list). Regardless of whether the ordered item list is scrolled, after act 210 or 212 the current location marker is moved as necessary to identify the next item in the list that is to be handled by the user (act 214). In some situations, movement of the current location marker may not be necessary due to the scrolling performed (e.g., as illustrated with reference to lists 176 and 178 in FIG. 3). At some point after the current location marker is moved (if necessary), user input is received corresponding to the identified next item in the list (act 216). The process then returns to determine whether the end of the list has been reached (act 206).

The item list and current location identifier or marker can be displayed in a wide variety of different manners. FIGS. 6 and 7 illustrate alternative displays of the item list and current location identifiers with reference to a sequence of tasks to be completed in order to record a new inspection (e.g., a building inspection). In the exemplary display 240 of FIG. 6, an item list portion 242 and an applet window portion 244 are illustrated. The item list portion 242 includes a list of tasks that are to be handled by the user, each of which is information to be entered by the user. Once entered, the information is displayed in applet window portion 244. A current location marker 246 advances down the list in portion 242 to identify the current information that the user needs to input (the customer's state in the illustrated display). Additional information is displayed at the top of display 240, including a prompt 248 identifying a type of information being entered by the user (inspection information).

In the exemplary display 260 of FIG. 7, a multi-tiered item list is displayed including list portion 262 and list portion 264. In list portion 262, prompts for the overall process of recording a new inspection are listed, including selecting a new inspection option and then entering inspection information. Two current location markers 266 and 268 are illustrated, each providing a visual indication of where in the overall process the current user is (inspection info in the illustrated display). A prompt 270 provides a further identification to the user of where he or she is in the overall process. List portion 264 includes prompts for the process of entering inspection information, with a current location marker 272 providing a visual indication of where in the inspection information entry process the user currently is (customer state in the illustrated display).

In addition to tracking the status of tasks being performed by a single user, the dynamic displaying of the current status of tasks of the present invention can further be used to track the status of tasks being performed by multiple users. In this situation, information indicating the status of tasks being performed by multiple users is communicated back to the computing devices of one or more other users, who in turn can view the status information of multiple users on a single display.

Figure 8:
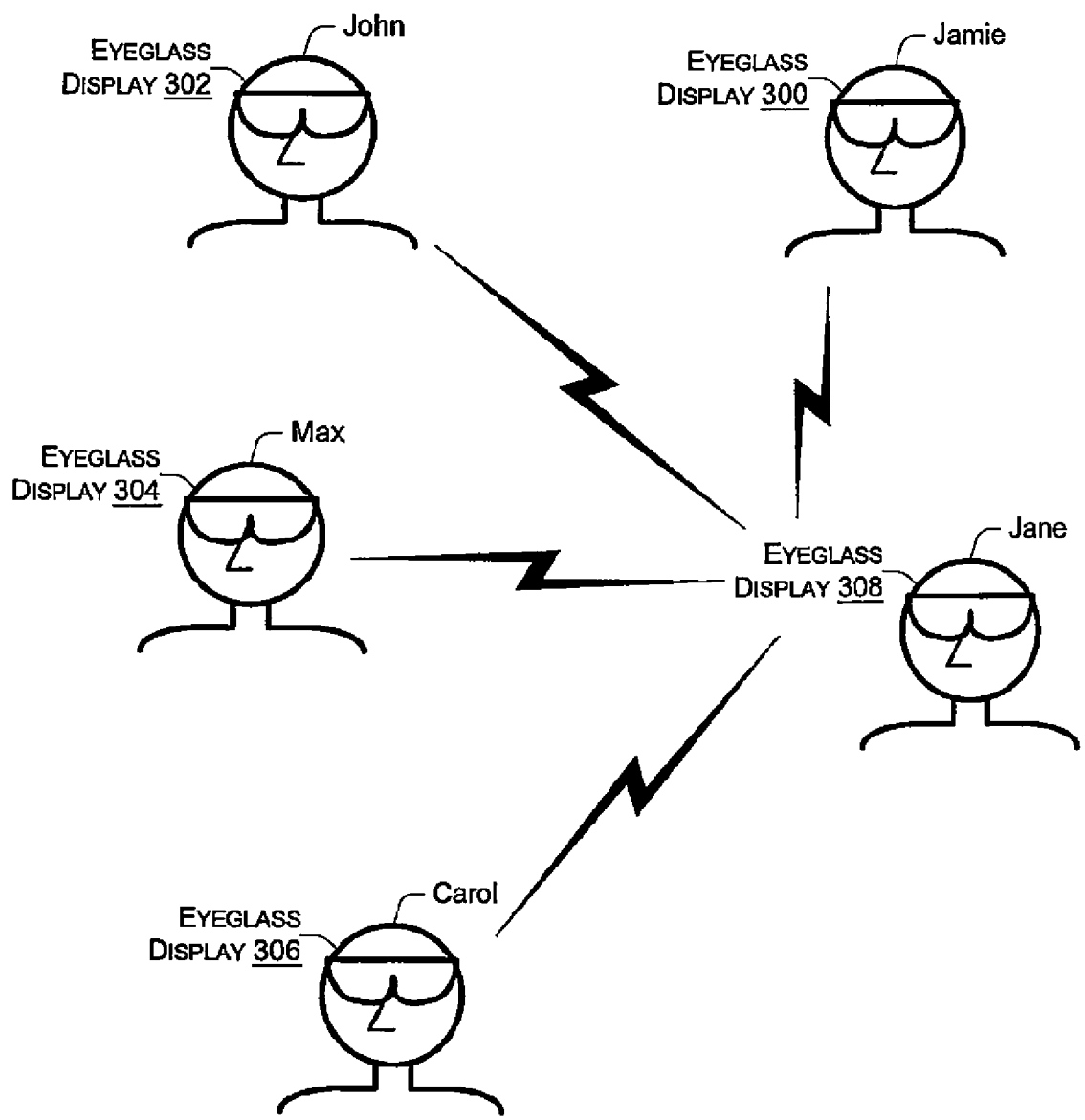
FIG. 8 illustrates an exemplary distributed environment in which the status of tasks being performed by multiple users can be monitored.

FIG. 8 illustrates an exemplary distributed environment in which the status of tasks being performed by multiple users can be monitored. In the illustrated example, multiple users Jamie, John, Max, and Carol each have a wearable computer with an eyeglass display 300, 302, 304, and 306, respectively. An item list is displayed on the eyeglass display for each of these users, with a current location marker to identify to the respective users where they are in the task sequences they are performing. Information regarding their current location is also communicated to another computing device of their supervisor Jane, who is also wearing an eyeglass display 308. The information communicated to Jane's computer can be simply an identification of the current location (e.g., Jane's computer may already be programmed with all of the tasks in the list), or alternatively the entire (or at least a portion of) the item list. The information for one or more of the users Jamie, John, Max, and Carol can then be displayed on display 308, allowing Jane to keep track of the status of each of the users Jamie, John, Max, and Carol in performing their tasks. This allows Jane, as the supervisor, to see if people are proceeding through their tasks too quickly or too slowly (e.g., a user may be having difficulty and need assistance), to know when the individual users will be finished with their tasks, etc. If a multi-tiered item list is being used, then the supervisor can also zoom in on the particular step of a user and get additional information regarding where the user is stuck.

FIG. 9 illustrates an exemplary group of lists that may be displayed on eyeglass display 308 of FIG. 8. Assume that each of the users John, Jamie, Max, and Carol are each performing a machine assembly process involving the following tasks: inventory the necessary parts, assemble an intake, lubricate a core part of the machine, install the assembled intake, verify that the batteries are fully charged, and then run a diagnostic program. The tasks in the machine assembly process are illustrated in a portion 310 of display 308 in an abbreviated form. Alternatively, the tasks illustrated in portion 310 may not be abbreviated, or may be represented in some other manner (e.g., as icons). A separate item list is displayed on display 308 for each of the users along with a corresponding current location marker in the shape of a ball or circle. Thus, as illustrated in FIG. 9, the viewer of display 308 can readily identify that John is at the "assemble intake" step, Jamie and Max are both at the "install intake" step, and Carol is at the "verify charge" step. Thus, the supervisor viewing display 308 can quickly and easily determine, based on the item list and current location markers, that each of Jamie, Max, and Carol is proceeding normally through the assembly process, but that John is hung up on the "assemble intake" step, so the supervisor can check with John to see if he is experiencing difficulties with this step.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable media storing a computer program that, when executed by one or more processors on a mobile computer, causes the one or more processors to:
   present, on a display, a subset of a plurality of steps in an order to be performed by a user;
   alter an appearance of a current step in the subset of steps that needs to be performed by the user to distinguish the current step from other steps in the subset;
   receive information about a current context of the user from a context awareness component that receives sensed information from multiple sources and that mediates amongst the multiple sources to build a model of the current context of the user, the information about the current context of the user comprising information on the user's current location, current activity and/or previous behavior;

in response to the received information about the current context of the user, alter instructions for performing one or more of the subset of steps that need to be performed by the user based on the received information;

allow the user to input data corresponding to the current step;

when input data is not received from the user for the current step and information received from the context awareness component indicates that the user currently has a high cognitive load, alter a manner of presenting information to the user relating to the current step, comprising selecting a manner of presentation that is less intrusive upon the user and formatting the information relating to the current step based on the selected manner of presentation;

scroll, in response to user input of data corresponding to the current step, the plurality of steps so that a new subset of the plurality of steps is presented to the user; and amend the step for which the data input was received from the user with indications of that data input.

2. One or more computer-readable media as recited in claim 1, wherein the computer program further causes the one or more processors to:

alter, in response to user input of data corresponding to the current step, the appearance of another step as necessary to identify the new current step in the subset of steps that needs to be performed by the user.

3. One or more computer-readable media as recited in claim 1, wherein altering the appearance of the current step comprises marking the current location with a ball.

4. One or more computer-readable media as recited in claim 1, wherein altering the appearance of the current step comprises displaying the current step differently than other steps in the subset.

5. One or more computer-readable media as recited in claim 1, wherein altering the appearance of the current step comprises replacing the current step with a set of one or more input options for the current step.

6. One or more computer-readable media as recited in claim 1, wherein altering the appearance of the current step comprises superimposing, on the current step, a set of one or more input options for the current step.

7. One or more computer-readable media as recited in claim 1, wherein the computer program further causes the one or more processors to:

replace, in the subset, the display of the current step with a display of the input data.

8. One or more computer-readable media as recited in claim 1, wherein the computer program further causes the one or more processors to:

display a current processing marker that identifies which step in the subset of steps is currently being processed by the one or more processors.

9. One or more computer-readable media as recited in claim 1, wherein the one or more computer-readable media comprise a computer memory of a wearable computer.

10. A method comprising:

displaying a list of items to be handled by a user in a particular order;

identifying one item in the list of items that is a current item;

displaying instructions for performing the current item, the instructions specifying one or more possible inputs by the user in relation to the current item;

receiving information about a current context of the user;

in response to the received information about the current context of the user, altering a manner in which the instructions for performing the current item are presented based on the received information, the altering comprising selecting a manner of presentation that is less intrusive upon the user and formatting the instructions for performing the current item based on the selected manner of presentation;

receiving a user input corresponding to the current item;

updating, in response to receiving the user input, the list to reflect the received user input corresponding to the current item; and updating the identification of the one item that is the current item to indicate the next item in the list of items as the current item.

11. A method as recited in claim 10, wherein displaying the list of items comprises displaying at least one item corresponding to a task that has already been performed and at least one item corresponding to a task that still needs to be performed by the user.

12. A method as recited in claim 10, wherein displaying the list of items comprises displaying, after the user input is received, the user input in place of the corresponding item.

13. A method as recited in claim 10, wherein displaying the list of items comprises displaying only a subset of the list of items at any given time, the subset of the list of items comprising a plurality of items.

14. A method as recited in claim 13, further comprising scrolling through the list of items to display different subsets as items in the list are handled by the user.

15. A method as recited in claim 10, further comprising displaying a current processing marker identifying an item in the list of items corresponding to a current user input being processed.

16. A method as recited in claim 10, wherein the list of items comprises a list of tasks to be completed by the user, and wherein handling of an item by the user comprises the user completing the task.

17. A method as recited in claim 16, wherein the list of tasks comprises a list of prompts corresponding to data to be entered into the computer by the user.

18. A method as recited in claim 10, wherein the list of items comprises a list of prompts of words to be spoken by the user, and wherein handling of an item by the user comprises speaking one or more words corresponding to the prompt.

19. A system comprising:

one or more output devices;

a user interface component, coupled to an output device, causing a user interface to be output on the output device;

a module that provides information about the current context of the user to the user interface component;

wherein the user interface includes a list portion in which a list of a plurality of items to be handled by a user are output;

wherein the user interface further includes a current location marker identifying one of the items in the list as the current item to be handled by the user;

wherein the user interface further displays information relating to the current item, the information comprising one or more possible inputs by the user in relation to the current item in the list;

wherein the user interface further updates the list, in response to the user providing an input in relation to the current item in the list, to reflect the provided input;

wherein the user interface component further automatically updates the current location marker to identify a new item in the list in response to the user handling the current item in the list;

wherein the user interface component, in response to the received information about the current context of the user, alters a manner of presenting information to the user, comprising selecting a manner of presentation that is less intrusive upon the user and formatting the information to be presented based on the selected manner of presentation.

20. A system as recited in claim 19, wherein the user interface component further replaces, after the user has handled the current item, a user input in place of the current item.

* * * * *